Figure 1:
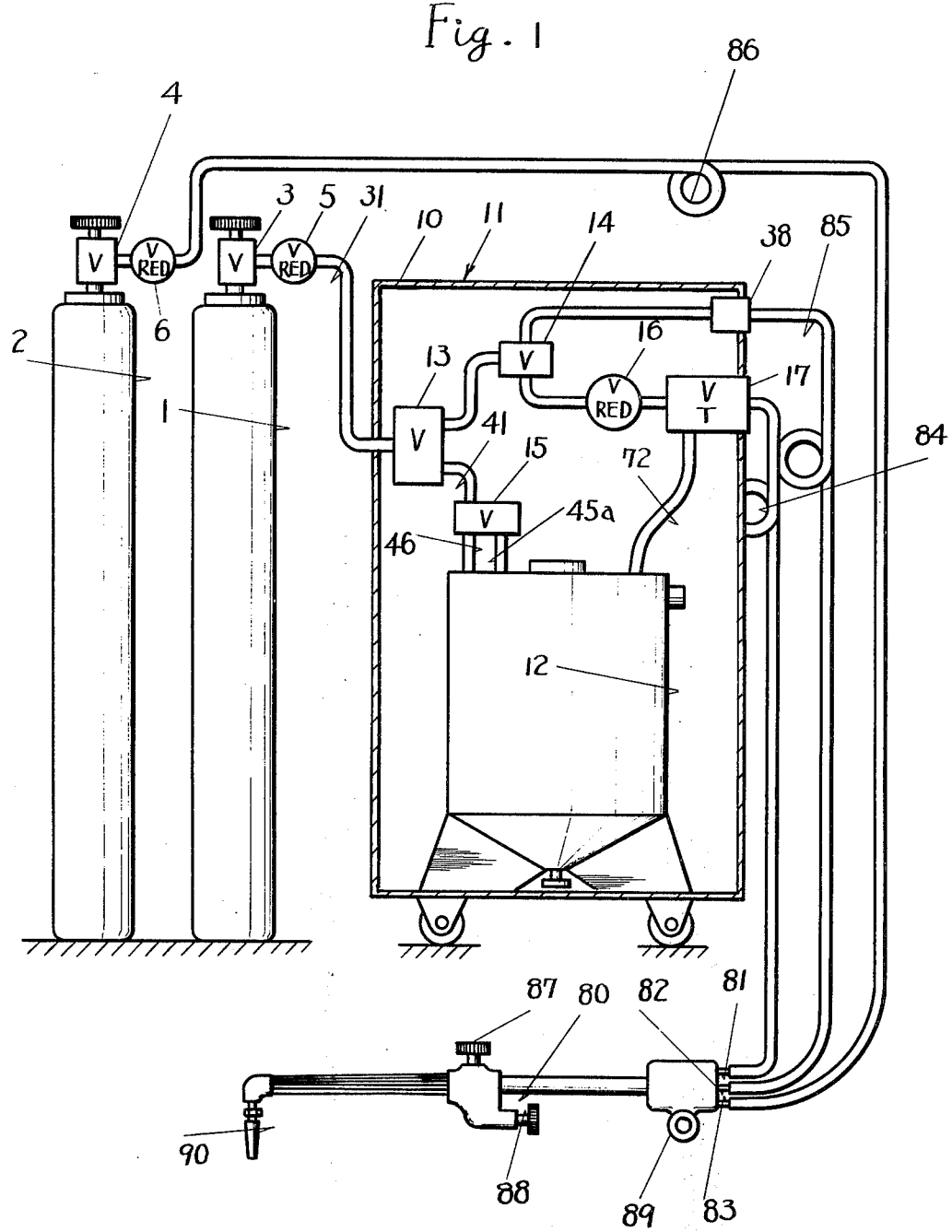

United States Patent [19]

Okui

[11] 4,022,442

[45] May 10, 1977

[54] WELDING AND CUTTING APPARATUS

[76] Inventor: Seiichi Okui, 581,1380-banchi Hattorigawa, Yoa, Osaka, Japan

[22] Filed: June 13, 1975

[21] Appl. No.: 586,811

[52] U.S. Cl. ............................................. 266/75
[51] Int. Cl.² ........................................ B23K 7/08
[58] Field of Search ............. 266/23 R, 23 S, 23 T, 266/74, 75; 239/424.5

[56] References Cited

UNITED STATES PATENTS

| | | | |
|---|---|---|---|
| 2,608,446 | 8/1952 | LaPota | 266/23 S X |
| 2,840,016 | 6/1958 | Chouinard et al. | 266/23 S X |
| 2,939,410 | 6/1960 | Karpuk et al. | 266/23 S X |
| 3,650,515 | 3/1972 | Okui | 266/23 S |

Primary Examiner—Roy Lake
Assistant Examiner—Paul A. Bell

[57] ABSTRACT

The present invention relates to a device for welding and cutting stainless steel or other various alloys wherein the mixture of pure oxygen and metallic powder mainly made of iron is jetted under high pressure at an object to weld or cut which is welded or cut at high heat by the effect of metallic powder combustion and that of oxygen conducive to the combustion.

2 Claims, 2 Drawing Figures

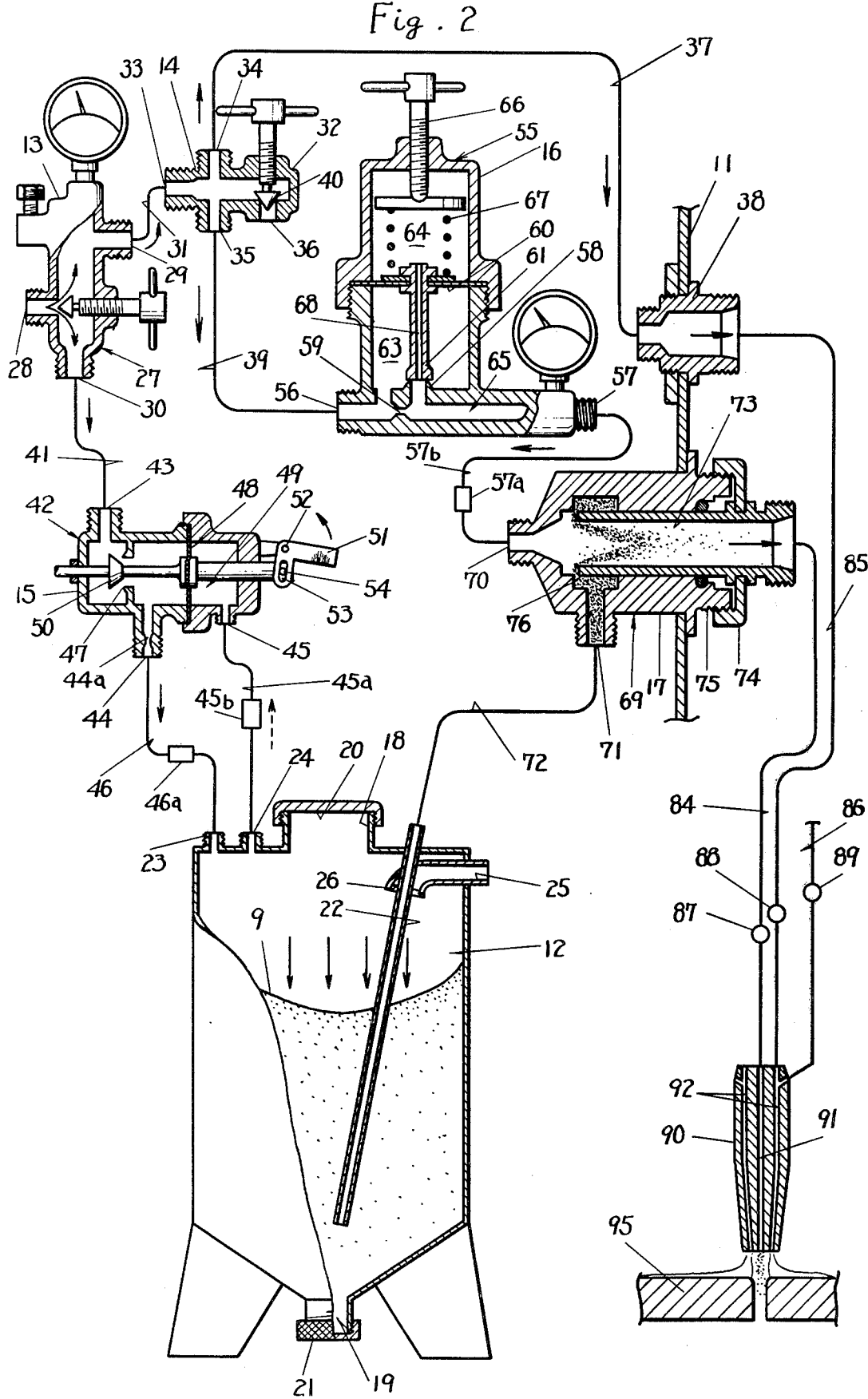

WELDING AND CUTTING APPARATUS

The object of the present invention is to keep steady at any time the mixture ratio of metallic powder to high pressure oxygen which is jetted at the object to weld or cut. Thus the same quantity of metallic powder can be always supplied to the object by mixing metallic powder with oxygen always at the same ratio. For this reason, heat capacity on the surface of the object is always kept steady. Therefore the object can be beautifully and evenly welded or cut.

Another object of the present invention is to prevent metallic powder from being burned by backfire in a tank which contains said metallic powder. By this means an explosion can be prevented and the loss of a great amount of metallic powder can be avoided.

Other objects and advantages of the present invention will appear from the following detail description and drawings of preferred embodiments of the present invention in which:

FIG. 1 is a general view of the whole device illustrating the preferred embodiment of the present invention; and FIG. 2 is an enlarged sectional view of the essential parts in FIG. 1.

As illustrated in FIG. 1, the present invention, a hot welding and cutting apparatus which uses metallic powder, consists of two gas bombs 1 and 2, a machine unit 10 and a torch burner 80 for welding and cutting.

One gas bomb or tank 1 is filled with pure oxygen under high pressure and the other gas bomb or tank 2 with combustible gas such as acetylene gas and propane gas in high pressure. These gas bombs 1 and 2 are provided with shut-off valves 3 and 4 and pressure control valves 5 and 6 on the heads of them. The pressure control valve 5 on the gas bomb 1 is made to lower the pressure of high pressure oxygen of 150 kg/cm$^2$ at its highest down to 8 kg/cm$^2$, and the pressure control valve 6 of the other gas bomb 2 is made to lower the pressure of high pressure combustible gas of 20 kg/cm$^2$ at its highest down to 0.5 kg/cm$^2$.

On the other hand said machine unit 10 comprises within a casing 11, a tank 12, two distributing valves 13 and 14, a thermovalve thermo-valve which is shut in an emergency, a differential pressure regulating valve 16 and a powder flux regulating valve 17. As illustrated in FIG. 2, said tank 12 has an filling opening 18 for filling metallic powder 9 at the head of it and an opening 19 for letting out said metallic powder at the bottom of it, the openings 18 and 19 being provided with caps 20 and 21 attached to them through screw grooves. Also said tank 12 is provided with an inductive pipe 22 for communicating with the inside and outside of said tank. Further, said tank 12 is provided on its head both with two ports 23 and 24 for connecting with said thermo-valve 15 and with an emergency exhaust pipe 25. Said emergency exhaust pipe 25 communicates with the inside and outside of said tank 12, and a fuse 26 formed on the tip of said pipe 25 which surrounds the inductive pipe 22 shuts off the inside and outside of the tank.

The above-mentioned distributing valve 13 is provided in its housing 27 with three ports 28, 29, and 30. As illustrated in FIG. 1, the first port 28 connects with the bomb 1 through a tube 31. The second port 29 connects through the tube 31 with the first port 33 of the other distributing valve 14. Further, the third port 30 connects through a tube 41 with the first port 43 of said thermo-valve 15.

The above-mentioned distributing valve 14 is provided in its housing 32 with four ports 34, 35, and 36, including said first port 33. The second port 34 connects through a tube 37 with a joint port 38 fixed in the casing 11. Also, the third port 35 connects through a tube 39 with the first port 56 of said differential pressure regulating valve 16. Further, the fourth port 36 is confronted with a needle valve 40 and pressure is extracted from said port 36 when necessary by manipulating said needle valve 40.

The above-mentioned thermo-valve 15 is provided in its housing 42 with three ports 44, and 45, including the first port 43. The second port 44 connects with the port 23 of said tank 12 through a tube 46 provided with a throttle 44a formed inside the port edge 44 and a filter 46a. The third port 45 connects with the other port 24 of said tank through a tube 45a to which is attached a filter 45b. Also, said thermo-valve 15 is provided with a valve seat 47 in between said first port 43 and its second port 44 and also with a diaphragm 48 in between the second port 44 and the third port 45, a valve 50 supported by said diaphragm 48 being in contact with said valve seat 47. Further, one end of a valve rod 49 in said thermo-valve 15 is projected outside the housing 42 and a lever 51 is engaged with said valve rod 49. Said lever 51 is hook-shaped and supported on the housing 42 through a pin 52, and a pin 54 projected from said valve rod 49 is inserted in a long hole 53 made at one end of the lever 51.

Said differential pressure regulating valve 16 is provided with two ports 56 and 57. The port 57 connects through a tube 57b to which is attached a filter 57a with the first port 70 of the flux regulating valve 17. Said differential pressure regulating valve 16 is also provided with a valve seat 58 in between the first port 56 and the second port 57 and with a chalk 59 in the passage by which bypasses said valve seat 58. Also, said valve seat 58 contacts with a valve 61 supported by diaphragm 60. In the housing 55 are provided a first chamber 63, a backpressure chamber 64 with said diaphragm in between, and a second chamber 65 behind said valve seat 58. Further, within said backpressure chamber 64 is positioned a spring 67 between said diaphragm 60 and an adjust screw 66, while the second chamber 65 and the backpressure chamber 64 are communicated through the passage 68 cut through the center of said valve 61.

The above-mentioned powder flux regulating valve 17 is provided in the housing 69 with two ports 70 and 71, said second port 71 being connected through a tube 72 with the tip of said inductive pipe 22. A sleeve 73 is slidably inserted toward the shaft in the housing 69. Said sleeve 73 is hollow within and a nut 74 fixed in one end of the sleeve 73 is engaged with a screw 75 at one end of the housing 69 so that the opening degree of an orifice 76 provided between the corner of the sleeve 73 and that of the housing 69 can be adjusted between the first port 70 and the second port 71.

The torch burner 80 mentioned above in FIG. 1 is provided with three pipe joints 81, 82, and 83. One of them (81) connects through a flexible hose 84 with the exit of the powder flux regulating valve 17. Another connects through a flexible hose 85 with said joint 38 and the last one, 83, connects through a flexible hose 86 with the exit of the pressure control valve 6 attached to the combustible gas bomb 2. Said torch burner 80 is provided with three flux regulating valves 87, 88, and 89, the sectional structure of the tip of a nozzle 90 being illustrated in FIG. 2. In the center of said nozzle 90 is provided a passage 91 for jetting high pressure gas, said passage 91 and the hose 84 being communicated. Also around said passage 91 are provided plural passages such as 92 for jetting mixed gas, these passages 92 being communicated with the hoses 85 and 86.

The present invention is structured as mentioned above and its operations are as follows.

As illustrated in FIG. 1, when each of the shut-off valves 3 and 4 of the gas bombs 1 and 2 is opened, oxygen is conveyed through the tube 31 to the inside of the distributing valve 13, while a combustible gas is conveyed through the hose 86 directly to the torch burner 80. The oxygen conveyed to the port 28 of the distributing valve 13 is illustrated in FIG. 2 is divided into two directions as the arrow marks in the drawing indicate, one of them being toward another distributing valve 14 and the other toward the thermo-valve 15. The oxygen streamed into said distributing valve 14 is here again divided into two directions. One of them is conducted through the tube 37 and the hose 85 toward the nozzle 90 of the torch burner and, mixed with the combustible gas within said nozzle 90, is jetted out through the passage 92. Thus, the mixed gas jetting out through the passage 92 is used for preparatorily heating the object to weld and cut by combustion. On one hand, the oxygen divided within said distributing valve 14 streams through the tube 39 into the differential pressure regulating valve 16. This differential pressure regulating valve 16 closely connects the valve seat 58 and the valve 61 by the spring 67, thereby oxygen pressure passed through the chalk 59 operates on the inside of the second chamber 65. Therefore, when the flux regulating valve 87 is closed, no differential pressure occurs between the first chamber 63 and the second chamber 65 in the differential pressure regulating valve 16. Then as the flux regulating valve 87 of the torch burner is opened, a differential pressure occurs between the first chamber 63 and the second chamber 65 by the low resistance of the chalk 59. As said second chamber 65 and the backpressure chamber 64 are communicated through the passage 68, a differential pressure occurs between the first chamber 63 and the backpressure chamber 64 with the diaphragm 60 in between, so the valve 61 is moved away from the valve seat 58. In comparing the opening area of the chalk 59 with that of the valve seat 58, the opening area of the chalk 59 is made so small that the oxygen is controlled under pressure by passing by the side of the valve seat 58. Thus, the differential pressure between the first chamber 63 and the second chamber 65 is kept balanced by the spring 67. Even if the pressure of the first chamber 63 changes, said differential pressure is always kept steady.

On the other hand, when the contact of the valve seat 51 and the valve 50 in the heat switching valve 15 is released by the lever 51 and oxygen is conducted through the tube 46 into the tank 12, said oxygen puts pressure upon the surface of the powder 9 and pushes out said powder through the inductive pipe 22 into the tube 72. The quantity of the metallic powder pushed out is regulated by the orifice 76 of the flux regulating valve 17. As the opening area of the throttle 44a of the thermo-valve is made larger than that of said orifice 76, there occurs no flow resistance around said throttle 44a. Therefore, the pressure within the circuit from the tube 31 through the distributing valve 13 and the tube 41 and the thermo-valve 15 and the tube 46 and the tank 12 to the tube 72 corresponds to the established pressure of the pressure control valve 5 attached to the bomb 1, while the pressure of oxygen passing into the sleeve 73 of the powder flux regulating valve 17 is reduced by the differential pressure regulating valve 16. The additional oxygen pressure in the sleeve 73 caused by the oxygen flowing from the regulating valve makes the total oxygen pressure in the sleeve slightly higher than the pressure of the powder, and this kind of differential pressure is always kept steady by the control of the differential pressure regulating valve 16. Therefore, the flux of metallic powder passing through the orifice 76 is always kept steady. In other words, the mixture ratio of metallic powder to high pressure oxygen jetted from the passage of the nozzle 90 is always kept steady. Thus by supplying metallic powder against the preliminarily heated object to weld or cut (95), the powder is burned and the heat capacity on the surface of said object 95 is increased. Therefore, the effect of welding and cutting by the jetting of high pressure oxygen is greatly heightened and there can be produced a high heat jet flow for cutting other alloys than iron.

The pressure operating on the surface of the metallic powder 9 in said tank 12 is also operating through the tube 45a on a pilot chamber formed by the diaphragm 48 in the thermo-valve 15. For this reason, the equal pressure appears on both faces of said diaphragm 48, and, even if a manually operating power on the lever 51 is released, the space between the valve seat 47 and the valve 50 is always kept open. The combustibility of metallic powder is extremely high. However, as the speed of jet flow in the passage of the nozzle 90 is very high, backfire in said nozzle 90 rarely happens. But as an exception, if the flux regulating valve 87 is not perfectly closed and a small amount of oxygen leaks into the passage 91, there is a possibility of backfire. Suppose the backfire happens; then the metallic powder in the hose 84 is burned and the flame spreads from the tube 72 to the metallic powder in the inductive pipe 22. When heat is conveyed to the inductive pipe 22 by this kind of backfire phenomenon, the fuse 26 is melted and the pressure in the tank 12 is rapidly exhausted through the emergency exhaust pipe 25. In this case, there is the throttle 44a inside the second port 44 of the thermo-valve and there can be produced a difference in the pressure operating on both sides of the diaphragm 48 by said throttle 44a, so that the valve seat 47 and the valve 50 are closed and the supply of oxygen into the tank is stopped. Air is mixed in the tank by the opening of the emergency exhaust pipe 25. As metallic powder does not burn in the air, the spread of the fire to the metallic powder in the tank is prevented from occurring. Even if it has spread to the metallic powder in the tank, the oxygen in the tank is immediately consumed by the combustion of powder and the fire is thus naturally extinguished.

As is mentioned above, in the present invention, the differential pressure regulating valve 16 is positioned in the middle of the tube leading to the passage 91 which is for jetting high pressure oxygen and which is cut through in the center of the nozzle 90 of the torch burner, while the exit of the inductive pipe 22 in the metallic powder-containing tank 12 is communicated through the orifice 76 of the flux regulating valve 17 to the second port 57, whereby the differential pressure screened by said orifice 76 is always kept steady and then the ratio of metal to oxygen is always kept steady; therefore the heat capacity on the surface of the object to weld or cut becomes steady and the object can be welded or cut beautifully without unevenness. The present invention can achieve this purpose.

Furthermore, in the present invention, the inside and outside of the tank 12 are intercepted by the fuse 26 so positioned as to contact with the inductive pipe 22, while in the middle of the tube leading from the gas bomb 1 to the tank 12 is positioned the thermo-valve 15 whose space between the valve seat 47 and the valve 50 is kept open by the equal pressure of oxygen operating on both sides of the diaphragm 48 and in the rear position of said space is provided the throttle 44a, whereby the fuse 26 is melted by backfire heat and in the thermo-valve 15 is produced a differential pressure by means of which thermo-valve 15 is automatically closed and the supply of oxygen to the tank is stopped and thus powder combustion in the tank is checked. Owing to this kind of device, an explosion provoking phenomenon is excluded and the loss of a great amount of metallic powder is prevented. The present invention can achieve this purpose.

I claim:

1. An apparatus for use with a welding or cutting nozzle in welding or cutting equipment, said nozzle having three inlets for gases or metallic flux powder, one of the inlets in the nozzle being adapted for connection to a source of combustible welding gas, said apparatus being adapted for connection between an oxygen source and the nozzle and having three oxygen paths, a first oxygen path being for connection of oxygen to the nozzle at a second of said inlets in the nozzle, a second oxygen path including a pressure regulating valve and a metallic flux powder regulating valve where pressure regulated oxygen is mixed with the powder, the third oxygen path being connected in parallel with the said second path and including a chamber for the powder which is pressured by the oxygen to move the powder to the metallic flux powder regulating valve so that it can be mixed with the oxygen from said second path and fed to a third of said inlets of the nozzle, and backfire means comprising a housing and passageway means therethrough for passing the oxygen and metallic powder to the third inlet of the nozzle, said passageway having a heat fusible seal which in the event of backfire can melt and allow air to enter the chamber.

2. An apparatus for use with a welding or cutting nozzle in welding or cutting equipment, said nozzle having three inlets for gases or metallic flux powder, one of the inlets in the nozzle being adapted for connection to a source of combustible welding gas, said apparatus being adapted for connection between an oxygen source and the nozzle and having three oxygen paths, a first oxygen path being for connection of oxygen to the nozzle at a second of said inlets in the nozzle, a second oxygen path including a pressure regulating valve and a metallic flux powder regulating valve where pressure regulated oxygen is mixed with the powder, the third oxygen path being connected in parallel with the said second path and including a chamber for the powder which is pressured by the oxygen to move the powder to the metallic flux powder regulating valve so that it can be mixed with the oxygen from said second path and fed to a third of said inlets of the nozzle, and a thermo-valve through which oxygen passes into the powder chamber, and a heat fusible seal in the powder chamber which melts if backfire passes to the chamber and creates a pressure differential in the thermo-valve to shut off the thermo-valve and the supply of oxygen to the chamber.

* * * * *